US012600020B1

(12) United States Patent
Craven

(10) Patent No.: US 12,600,020 B1
(45) Date of Patent: Apr. 14, 2026

(54) STAPLE SET TOOL

(71) Applicant: Magnefficient LLC, Castle Pines, CO (US)

(72) Inventor: Joseph Powell Craven, Castle Pines, CO (US)

(73) Assignee: Joseph Powell Craven, Castle Pines, CO (US)

( * ) Notice: Subject to any disclaimer, the term of this patent is extended or adjusted under 35 U.S.C. 154(b) by 227 days.

(21) Appl. No.: 17/970,438

(22) Filed: Oct. 20, 2022

Related U.S. Application Data

(60) Provisional application No. 63/257,955, filed on Oct. 20, 2021.

(51) Int. Cl.
*B25C 3/00* (2006.01)

(52) U.S. Cl.
CPC .................................... *B25C 3/008* (2013.01)

(58) Field of Classification Search
CPC . B25C 3/006; B25C 3/008; B25F 1/02; B25B 15/004
USPC ............................................................... 81/44
See application file for complete search history.

(56) References Cited

U.S. PATENT DOCUMENTS

| | | | | |
|---|---|---|---|---|
| 4,966,056 | A * | 10/1990 | Miller | B25C 3/008 227/135 |
| 2013/0019718 | A1* | 1/2013 | Vienneau | B25C 11/00 81/44 |
| 2020/0246955 | A1* | 8/2020 | Zitlau | B25D 1/04 |
| 2022/0126434 | A1* | 4/2022 | Avalone | G09F 3/12 |

* cited by examiner

*Primary Examiner* — Katina N. Henson
(74) *Attorney, Agent, or Firm* — Brownstein Hyatt Farber Schreck, LLP

(57) ABSTRACT

A tool for holding a fastener during an alignment and setting operation may include a body structure that defines a first alignment channel configured to receive therein an object to be fastened to a workpiece. A first staple retention feature may be positioned at an end of the first alignment channel and configured to align a first staple relative to the first alignment channel such that opposite legs of the first staple are on opposite sides of the first alignment channel. The body structure may further define a second alignment channel configured to receive therein the object to be fastened to the workpiece, and a second staple retention feature may be positioned at an end of the second alignment channel and configured to align a second staple relative to the second alignment channel such that opposite legs of the second staple are on opposite sides of the second alignment channel.

20 Claims, 16 Drawing Sheets

STAPLE SET TOOL

CROSS-REFERENCE TO RELATED APPLICATION(S)

This application is a nonprovisional patent application of and claims the benefit under 35 U.S.C. § 119 (e) of U.S. Provisional Patent Application No. 63/257,955, filed Oct. 20, 2021, and titled "Staple Set Tool", the contents of which are incorporated herein by reference in its entirety.

TECHNICAL FIELD

The described embodiments generally relate to set tools. In particular, the described embodiments relate to magnetic set tool assemblies for holding and aligning a fastener when driving the fastener into a workpiece.

BACKGROUND

Fasteners are used for myriad purposes, such as to attach objects to one another or to hang objects on a wall. There are many varieties of fasteners, including screws, nails, staples, tacks, bolts, and nuts. Many types of fasteners, such as nails, tacks, and staples, are driven into a workpiece with an impact force, such as from a hammer. Such fasteners may first be "set" to a proper position relative to a workpiece before being "driven" into the workpiece.

In order to properly set and drive a fastener, a certain degree of skill and experience is necessary. Fasteners that are set and driven with, for example, an improper angle may be loosely secured, unsightly, or otherwise fail to perform their fastening function. Further, common methods of setting and/or driving a fastener may risk injury by exposing human body parts (e.g., a hand) to tools necessary to drive a fastener (e.g., a hammer may inadvertently strike a user's thumb). Additionally, projects with poorly set or driven fasteners may have reduced structural integrity or otherwise have a poor aesthetic appearance.

SUMMARY

This summary is provided to introduce a selection of concepts that are further described herein. This summary is not intended to identify key features or essential features of the claimed subject matter, nor is it intended to be used as an aid in determining the scope of the claimed subject matter.

A tool for holding a fastener during an alignment and setting operation may include a body structure that defines a first alignment channel configured to receive therein an object to be fastened to a workpiece. A first staple retention feature may be positioned at an end of the first alignment channel and configured to align a first staple relative to the first alignment channel such that opposite legs of the first staple are on opposite sides of the first alignment channel. The body structure may further define a second alignment channel configured to receive therein the object to be fastened to the workpiece, and a second staple retention feature may be positioned at an end of the second alignment channel and configured to align a second staple relative to the second alignment channel such that opposite legs of the second staple are on opposite sides of the second alignment channel. The body structure may also include a first magnetic attachment system configured to releasably retain the first staple to the body structure, and a second magnetic attachment system configured to releasably retain the second staple to the body structure.

In some examples, the first alignment channel and second alignment channel of the tool are perpendicular to one another. The first staple retention feature of the tool may be defined by a recess formed along a peripheral side of the body structure. A surface of the body structure may be configured to contact the workpiece when the object is positioned within the first alignment channel.

The end of the second alignment channel may be a first end of the second alignment channel and the tool may also include a third staple retention feature located at a second end of the second alignment channel and configured to receive a third staple therein. The tool may also include a third magnetic attachment system that is configured to releasably retain the third staple in the second alignment channel and in a position such that opposite legs of the third staple are on opposite sides of the third alignment channel.

A handheld tool for holding and aligning a staple may include a base that defines a bottom side. The bottom side may define a first alignment channel configured to at least partially receive a cable therein, and a second alignment channel configured to at least partially receive a cable therein. The base may also include a first staple retention feature positioned along the first alignment channel. The first staple retention feature may be configured to detachably hold a first staple such that legs of the first staple straddle the cable when the cable is at least partially received in the first alignment channel. Additionally, the base may include a second staple retention feature positioned along the second alignment channel, and the second staple retention feature may be configured to detachably hold a second staple such that the legs of the second staple straddle the cable when the cable is at least partially received in the second alignment channel. The handheld tool may have a handle coupled to the base and positioned opposite the bottom side.

The first staple retention feature may include a first magnet configured to magnetically retain the first staple to the base. The second staple retention feature may include a second magnet configured to magnetically retain the second staple to the base.

The first magnet may define an exposed magnet surface and may be configured to contact at least part of the first staple when the first staple is held to the base by the first magnet. The second magnet may define an exposed magnet surface and may be configured to contact at least part of the second staple when the second staple is held to the base by the second magnet.

The first staple retention feature of the base may define a first recess. The base may also include a first magnet positioned in the recess, and the first magnet may be configured to attract at least a portion of the first staple.

The handheld tool may include a carrying tab extending from the base. The base and the handle of the tool may be a monolithic piece. The base may be formed from a visually transparent material.

The first staple retention feature may be positioned at an end of the first alignment channel and the second staple retention feature may be positioned at an end of the second alignment channel. The base may define a staple retention slot extending from an opening along a peripheral side of the base, and the staple retention slot may be configured to detachably hold a third staple such that legs of the third staple straddle the cable when the cable is at least partially received in the first alignment channel. In some examples, the first alignment channel may have an adjustable width.

A tool for setting staples against a workpiece may include a base. The base may define a top surface, a first support column configured to contact a workpiece and defining a first side of an alignment channel. The alignment channel may be configured to receive therein at least a portion of an object to be attached to the workpiece. The base may also define a second support column configured to contact the workpiece and defining a second side of the alignment channel. The base may define a staple retention feature configured to detachably secure a staple to the base and position the staple such that the crown of the staple protrudes above the top surface of the base, and opposing legs of the staple straddle the alignment channel.

The staple retention feature may include at least one magnet configured to detachably secure the legs of the staple to the base. The staple retention feature may be a first staple retention feature, the alignment channel may be a first alignment channel, and the staple may be a first staple. The base may further define a third support column configured to contact the workpiece and defining a first side of a second alignment channel. The second alignment channel may be configured to receive therein the portion of the object to be attached to the workpiece. The base may also define a fourth support column configured to contact the workpiece and defining a second side of the second alignment channel, and a second staple retention feature configured to detachably secure a second staple to the base and position the staple such that the crown of the staple protrudes above the top surface and opposing legs of the staple straddle the second alignment channel.

The tool may further include at least one magnet coupled to the base and configured to detachably couple the legs of the staple to the base. The tool may also include a handle positioned over the top of the base.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

Figure 1A:
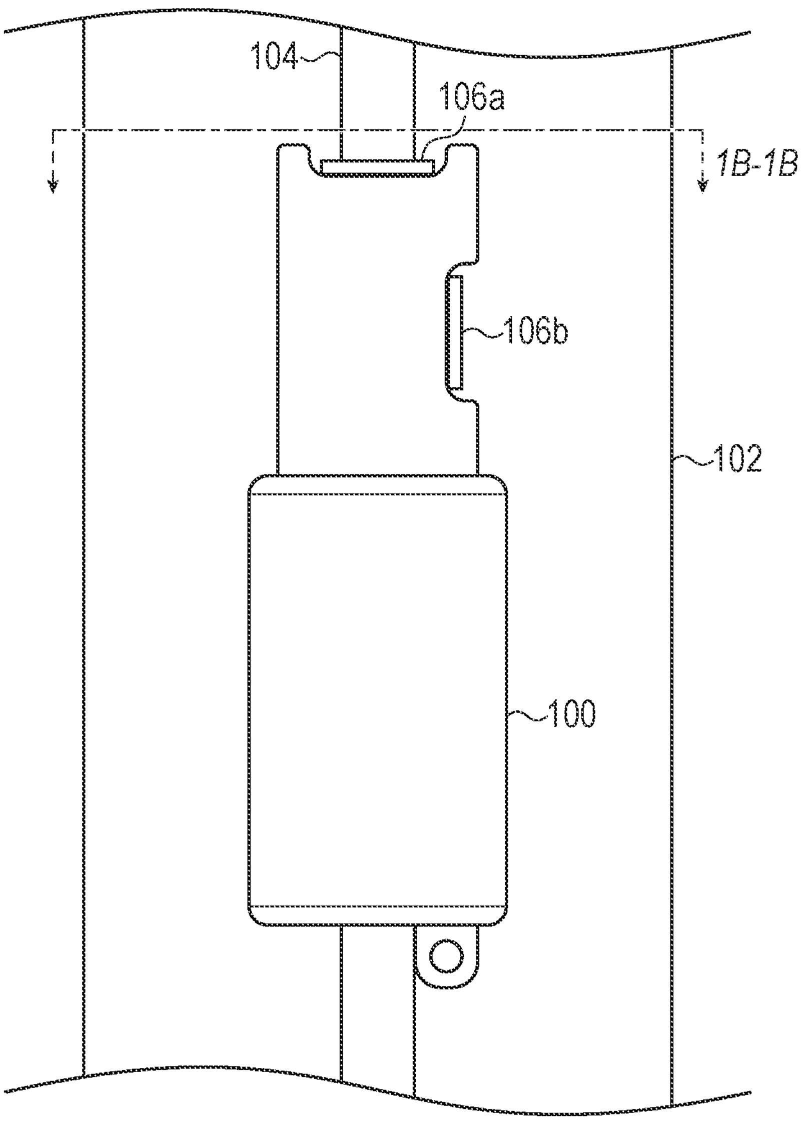
FIGS. 1A-1D depict an example tool for holding and setting staples.

The use of the same or similar reference numerals in different figures indicates similar, related, or identical items. Additionally, it should be understood that the proportions and dimensions (either relative or absolute) of the various features and elements (and collections and groupings thereof) and the boundaries, separations, and positional relationships presented, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Staples are used to secure objects to a workpiece in many different contexts. For example, electrical wiring in buildings is often secured to wall studs or other structural components using staples. As another example, fence materials (e.g., wire mesh fencing, barbed wire, etc.) is often secured to fence posts using staples. Fundamentally, a staple may include two legs, or tines, and a crown that connects the two legs or tines. An object, such as an electrical wire or fence wire, is positioned between the tines and the staple is driven into a workpiece, thereby capturing the object between the crown and the workpiece.

While staples can be driven into a workpiece using large, powered tools (e.g., pneumatic or electric staple guns), these powered tools are bulky, heavy, and expensive, and their size prevents their use in many situations. For example, when securing wiring to the studs of a wall, a pneumatic or electric staple gun may not fit in the needed space to perform the operation (e.g., between wall studs). Furthermore, the weight of the tool may make prolonged use difficult or dangerous. Moreover, large, powered tools may increase the likelihood of damage to the wiring, as the bulky tools may reduce dexterity and visibility of the workpiece, leading to more damaged wires and/or workpieces.

Without the benefit of a power tool, the user is left to manually place and hold the staple, including holding the staple, by hand, over the object to be secured. The user then strikes the crown (or butt) of the staple with a tool, typically a hammer. In this operation, the user's hand and digits are exposed to the swing path of the tool, which can lead to injuries if the hammer slips or is improperly aimed or if the staple slips out of position. Additionally, due to the size and shape of the staple, a proper alignment of the staple is challenging when staples are manually held. Misaligned staples can lead to misaligned staples [?], damage wiring (or other objects), and the like.

A set tool as described herein aids in properly aligning staples relative to a cable (or other object to be fastened), and holds the staples in place and in proper alignment during a setting and/or driving operation. FIG. 1A illustrates a tool 100 for holding a fastener, such as a staple, during an alignment and setting operation. The tool 100 holds staples (e.g., staples 106*a*, 106*b*) in place so that they can be safely driven into a workpiece 102 (e.g., a wood stud, a fencepost, etc.) safely, and also includes features that guide the tool 100 (and thus the staples 106) into proper alignment relative to an object 104 to be fastened. The object 104 may be a cable, a wire, a bundled wire (e.g., a multi-conductor cable), fence material, or any other object to be fastened to a workpiece 102.

The tool 100 may include a base 112 (FIG. 1C) or other body structure that defines channels (or legs or other features) that straddle an object to be fastened, and the tool 100 may releasably retain the staples to the tool in a position such that, when the object is positioned in the channel and the tool is placed on the workpiece, the staple also straddles the object and is ready to be driven. Thus, for example, when the tool 100 is held against the workpiece 102, the staple 106*a* is aligned with respect to the object 104 to be fastened.

Figure 1B:
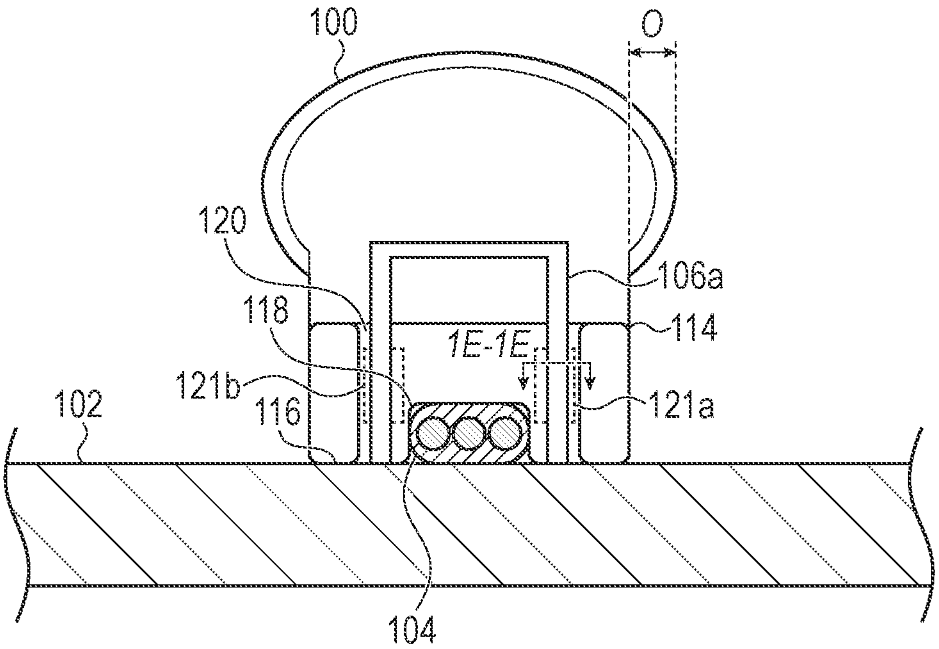

FIG. 1B shows an end view of the tool 100, viewed along line 1B-1B in FIG. 1A, showing the tool 100 positioned on the workpiece 102 and with the object 104 positioned in an alignment channel 118. As depicted, the tool 100 may define a top surface 114 and a staple retention feature 120. The staple retention feature 120 may align the staple 106*a* such that the legs of the staple 106*a* point towards the workpiece 102 and straddle the object 104 when the tool is placed over the object 104 (e.g., when object 104 is positioned in the alignment channel 118).

The staple retention feature 120 may align a staple (e.g., the staple 106*a*) relative to the first alignment channel 118 such that opposite legs of the staple 106*a* are on opposite sides of the alignment channel 118. An attachment system, such as a magnetic attachment system described herein, holds and/or removably couples the staple 106*a* to the tool 100. As depicted, the staple 106*a* may be held in a position in which the staple 106*a* straddles the alignment channel 118, and thus straddles the object 104 when the tool 100 is placed on the workpiece 102 with the object 104 in the alignment channel 118. Stated another way, the tool 100 holds the staple 106*a* such that the object 104 is between the legs of the staple 106*a*.

When the staple 106*a* is coupled to the tool 100 (e.g., via the staple retention feature 120 and/or a magnetic attachment mechanism, described herein), the crown of the staple 106*a* protrudes above the top surface 114. To use the tool 100, a user may place the staple 106*a* on the tool 100, and place the tool 100 with the staple 106*a* over the object 104 and the workpiece 102. Using a hammer or other suitable striking tool, the user may hit the crown of the staple 106*a*, applying the striking force towards the workpiece, to fasten the staple 106*a* to the workpiece 102 and/or to secure the object 104. The user may then slide or otherwise remove the tool 100 from its position without the staple 106*a* coupled to the tool.

The shape and configuration of the tool 100 has various advantages. For example, the height of the portion of the tool that holds staples (e.g., in the dimension that stands proud of the work surface) does not interfere with the swing path distance of a striking tool, such as a hammer, during the operation because the tool body sits below the crown of the staple. By contrast, tools that hold the staple from its crown (e.g., the horizontal portion connecting the tines or legs) are considerably longer and thus reduce the available length of the swing path of the hammer or other striking tool. Moreover, such tools typically require the tool to be struck instead of the staple, which can result in more striking and attachment errors. The reduced height of the tool 100 and corresponding greater swing path is advantageous in tight spaces, such as between studs and other frame members. Further, by relieving the user of the burden of holding the fastener in their hands or fingers, the tool removes the user's digits from the area of the swing path, improving safety of the operation.

A least part of the tool 100 (e.g., a bottom surface 116) may sit flush with respect to the workpiece. The tool 100 may also define an alignment channel 118 that receives therein the object 104 to be fastened to the workpiece 102. The alignment channel 118 may be any suitable dimension to fit over the object 104 or any dimension suitable to fit at least partially over the object 104. The width of the alignment channel 118 may be smaller than the width between the legs of the staple 106*a*. In such cases, the staple, when properly positioned in the staple retention feature, may be inhibited from inadvertently contacting or piercing the object 104. In some cases, the width of the alignment channel 118 may exceed the width between the legs of the staple 106*a*. In such cases, a greater range of staple and object sizes may be accommodated by a single tool. In some cases, tools are provided for different object and/or staple sizes (e.g., with different alignment channel sizes and body heights for different object sizes/dimensions and staple sizes/dimensions).

The base 112 of the tool 100 may define a generally rectangular shape having a length and a width. The length of the base 112 may be about 4.0 inches, about 6.0 inches, about 9.0 nine inches, or any other suitable size. The width of the base 112 may be about 1.0 inch, about 1.5 inches, about 2.0 inches, or any other suitable size. The alignment channel 118 may extend along the full length of the base 112. Similarly, the alignment channel 128 may extend the full width of the base 112.

Figure 1C:
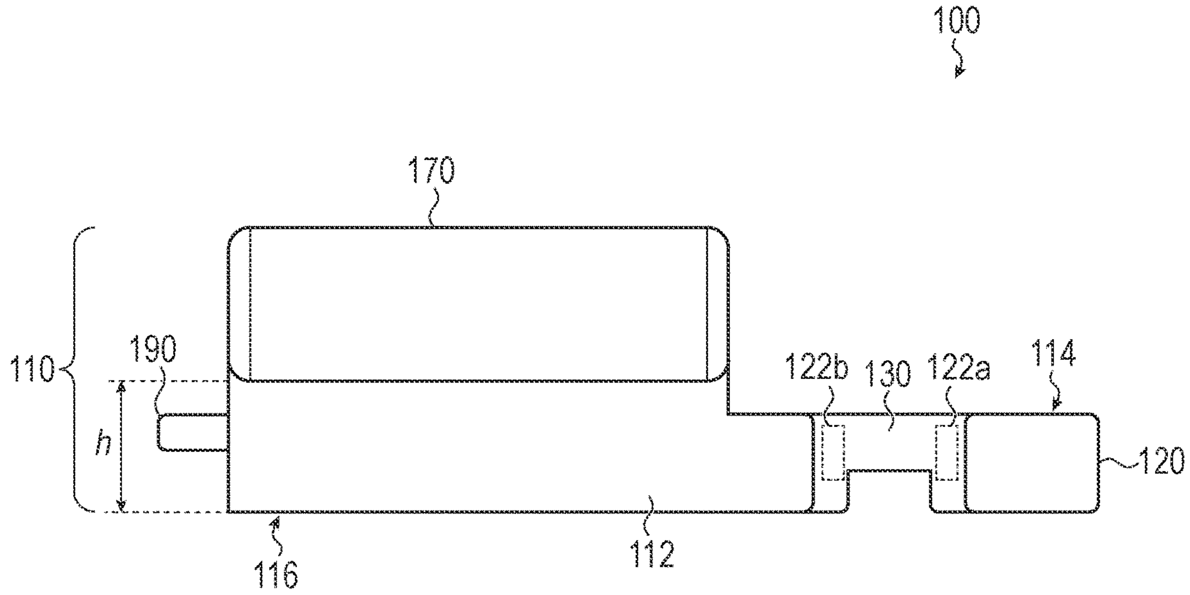
Figure 1D:
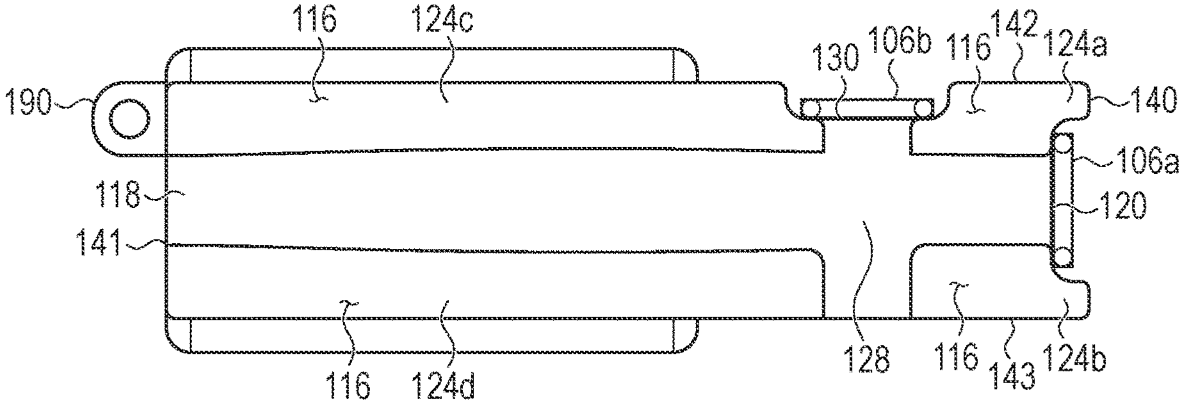

As depicted in FIG. 1D, the tool 100 may include support columns 124. Each support column 124 may define a portion of each of the alignment channels 118, 128 (and optionally additional alignment channels, as described herein). For example, support column 124*a* may define a portion of the first alignment channel 118 and a portion of the second alignment channel 128, support column 124*b* may also define a portion of the first alignment channel 118 and a portion of the second alignment channel 128, and so on. In other words, two support columns 124*a* and 124*b* on opposite sides may define a portion of the first alignment channel 118. Another portion of the first alignment channel 118 may be defined by support columns 124*c* and 124*d*. Similarly, support columns 124*a* and 124*c* may define a portion of the second alignment channel 128 and support columns 124*b* and 124*d* may define another portion of that alignment channel. Each of the support columns 124*a-d* may be different dimensions. In some examples, the tool may have more than four support columns that define additional alignment channels. The support columns 124*a-d* may each contact the workpiece during use and may provide the tool stability against the workpiece to set a staple (e.g., 106*a*, 106*b*).

The bottom surface 116 of the tool 100 may be defined by support columns 124*a-d*, shown in FIG. 1D. For example, a first support column 124*a* may define a first side of an alignment channel 118 and may contact the workpiece during use. Similarly, a second support column 124*b* may define a second side of the alignment channel 118 and may also contact the workpiece. The first and second support columns 124*a*, 124*b* may define portions of a bottom surface 116 of the tool 100, and the bottom surface 116 may contact the workpiece when driving a staple. The base 112 may also define a staple retention feature 120 that detachably secures a staple 106*a* to the base and positions the staple 106*a* such that the crown of the staple protrudes above the top surface 114, and such that opposing legs of the staple 106*a* straddle the alignment channel 118. The staple retention feature 120 may be positioned on a peripheral side 140 of the base. A third support column 124*c* may define a first side of a second alignment channel 128 and may contact the workpiece. A first support column 124*b* may define a second side of the second alignment channel 128 and may contact the workpiece. The base may also define a staple retention feature 130 that detachably secures a staple 106*b* to the base and positions the staple such that the crown of the staple protrudes above the top surface and opposing legs of the staple straddle the alignment channel 128. The staple retention feature 130 may be positioned on a peripheral side 142 of the base 112.

The staple retention features 120, 130 may be positioned along respective peripheral sides of the tool 100, and may extend from or be positioned between the top surface 114 and the bottom surface 116. For example, the staple retention features 120, 130 may be defined by recesses formed along peripheral sides 140, 142, respectively, of the base 112. Such recesses may help center and/or guide the staple with respect to the alignment channels 118, 128. The staple retention features 120, 130 may be defined by curved walls (e.g., walls having a convex profile), guiding columns, or the like, which may guide the staple as it is struck and may help to maintain staple alignment and to avoid contact with or damage to the cable or other object being fastened.

Staples may be retained to the tool 100 via magnetic attachment systems, such as magnetic attachment systems 121 (FIG. 1B) and 122 (FIG. 1C). The magnetic attachment systems may include distinct components, such as magnets 121*a*, 121*b* (FIG. 1B), and 122*a*, 122*b* (FIG. 1C), that magnetically attract the staples and retain the staples in place in the staple retention features 120, 130. The magnetic attachment systems 121, 122 may be or may include magnets, a ferromagnetic material, or any mechanism or material suitable to releasably couple a staple to the tool 100. The magnetic attachment systems 121, 122 may releasably retain a staple to the tool such that they remain in position during alignment and setting, while allowing the staple to detach from the tool easily when the staple is driven into the workpiece. Magnetic attachment systems 121, 122 may be provided at each staple retention feature (of which a tool may have several) to retain staples in position.

With reference to FIG. 1C, the tool 100 may include a body structure 110. The body structure may include a base 112 and a handle 170. The body structure 110 may be formed from any suitable material, such as polymer, plastic, rubber, silicone, aluminum, metal alloys, wood, and so on. The base 112 and the handle 170 may be formed from different materials. In some cases, the body structure 110 may be formed from a single unitary structure (e.g., molded plastic). The body structure 110 may also be formed from a visually transparent material. In some cases, the base 112 may include additional components or materials. For example, the base 112 may include a non-skid or non-slip material (e.g., a rubber material) applied to the bottom of the base 112 to define a bottom surface 116 of the base 112.

The base 112 of the body structure 110 may define the top surface 114 and the bottom surface 116 of the tool 100. The base 112 may define staple retention features, such as the first staple retention feature 120 and the second staple retention feature 130. The staple retention features may align a staple relative to an alignment channel, as described herein (see, e.g., FIG. 1B). For example, the first staple retention feature 120 may align a first staple relative to the first alignment channel 118. Similar to the first staple retention feature 120, as described above, the second staple retention feature 130 may align a second staple relative to a second alignment channel 128.

In some examples, as shown in FIG. 1C, the tool 100 may include a handle 170. The handle 170 may be a suitable length to allow a user to grasp the handle securely. The handle 170 may define a palm swell. The palm swell may be an enlarged portion that fits in the user's hand (e.g., the palm) when grasped by the user, which may allow a user to more comfortably and/or safely hold the tool 100. Tools may be provided with different sized palm swells to accommodate a wide range of users. The handle 170 may define finger grooves that fit a user's digits and to aid the user in securely grasping the tool. The position of the handle 170 may be configured to be a safe distance away from the staple retention features such that a user's hand, or any portion of the user's hand, is not struck by a hammer or other striking tool during staple setting. The handle 170 may be set apart from a nearest staple retention feature by a distance greater than about a 0.5 inches, greater than about 1.0 inches, greater than about 2.0 inches, greater than about 3.0 inches, or any other suitable distance. The handle 170 may take any shape suitable for holding the tool, such as a rounded handle, a pull handle, a finger ring handle, a u-shaped handle, a T-shaped handle, and so on. The handle 170 may be coupled to (or extend from) the base 112 at the top surface 114.

The handle may define an overhang O (FIG. 1B) that provides additional surface area for a user's hand without increasing the size of the base 112. In some examples, the height of the base h (FIG. 1C) may be larger than the thickness of a typical user's finger, such that the user can hold the tool in place without his or her fingers contacting the workpiece or otherwise interfering with the placement of the tool on the workpiece. In some examples, the height of the base h may be larger than the thickness of a typical user's fingers with work gloves such that a user wearing personal protective equipment may comfortably hold the tool 100 without his or her fingers being pinched. For example, the height of the base h may be about 0.25 inches, about 0.5 inches, about 1.0 inch, or any other suitable height. The handle 170 may be made from any suitable material, such as polymer, plastic, rubber, silicone, aluminum, metal alloys, wood, and so on. The handle 170 and the base 112 may be different materials. The handle 170 may have a coating or surface treatment, such as a textured coating or surface, rubber coating, or the like, to prevent slippage of a user's hand (e.g., when the user's hand is wet) when handling the tool. In some examples, the handle 170 and the base 112 may be a unitary, monolithic piece.

The tool 100 may also include a carrying tab 190, as illustrated in FIG. 1C. The carrying tab may receive a key ring, a carabiner, or the like. The carrying tab 190 may fit a user's finger. The carrying tab 190 may be positioned at an end of the base 112. In an example, the carrying tab 190 may be removably coupled to the base 112, such as screwed on, or the like. As depicted in the example in FIG. 1C, the carrying tab 190 may be positioned at a peripheral side of the base 112, opposite the staple retention feature 120. In some examples, the carrying tab 190 may be coupled at an end of the handle 170. The carrying tab 190 may be formed from any suitable material, such as polymer, plastic, rubber, silicone, aluminum, metal alloys, wood, and so on. The carrying tab 190, the base 112, and/or the handle 170 may be formed from a unitary piece (e.g., a single molded plastic structure).

FIG. 1D shows a bottom view of the tool 100 (e.g., showing the bottom surface 116). As described, the body structure or base 112 may define a first alignment channel 118 that receives therein an object to be fastened to the workpiece (see, e.g., FIGS. 1A-1B). As shown in FIG. 1D the first alignment channel 118 may extend from a first peripheral side 140 of the base 112 to a second peripheral side 141 of the base 112 opposite the first peripheral side 140. A first staple retention feature 120 may be positioned at an end of the first alignment channel 118 (e.g., at the first peripheral side 140 of the base 112).

The base 112 may define a second alignment channel 128 that receives therein an object to be fastened to a workpiece. The second alignment channel 128 may extend from a third peripheral side 142 of the base 112 to a fourth peripheral side 143 of the base 112 opposite the third peripheral side 142. A second staple retention feature 130 may be positioned at an end of the second alignment channel 128 (e.g., at the third peripheral side 142 of the base 112).

As explained above (see, e.g., FIG. 1B description), the bottom surface 116 of the base 112 may contact the workpiece when the object is positioned within the first alignment channel 118. Similarly, the bottom surface 116 of the base 112 may contact the workpiece when the object is positioned within the second alignment channel 128. As depicted, the first alignment channel 118 may be perpendicular to the second alignment channel 128, though other arrangements are also contemplated.

The first staple retention feature 120 may be defined by a recess formed along a peripheral side 140 of the base 112. Similarly, the second staple retention feature 130 may be defined by a recess formed along a peripheral side 142 of the base 112. The first and the second staple retention features 120, 130 may have similar dimensions. The first and the second staple retention features 120, 130 may be different dimensions to accommodate different staple sizes and/or different object sizes. The first and second staple retention features 120, 130 may be a protruding column that aligns at least one side of the staple (e.g., a single tine or leg) with respect to the tool 100. The protruding column may include a magnet to magnetically attach the tine of the staple to the tool.

Figure 1E:
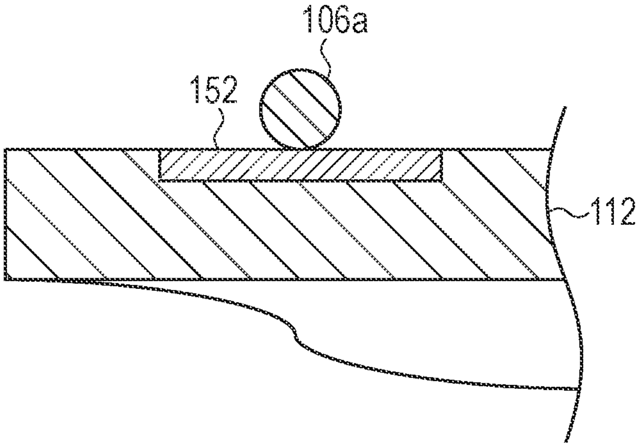
FIGS. 1E-1H depict examples of a magnetic attachment system of a tool for holding and setting staples.
Figure 1F:
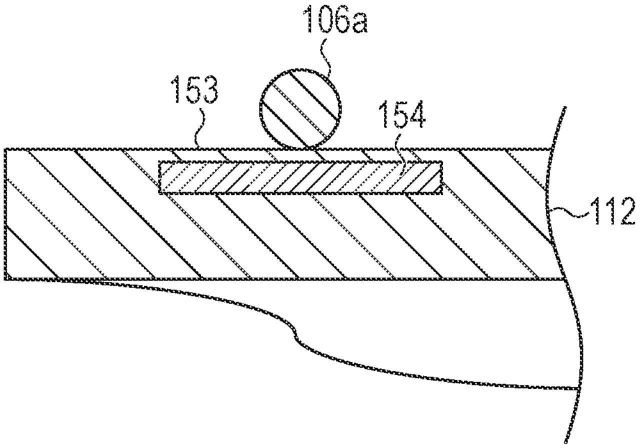
Figure 1G:
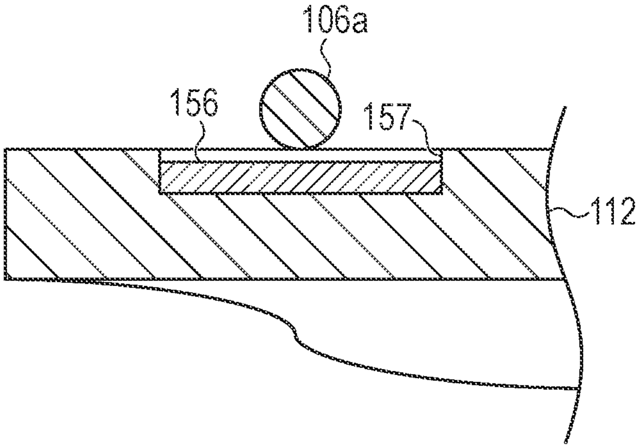

FIGS. 1E-1G show cross-sectional views of example implementations of the magnetic attachment system, viewed along line 1E-1E in FIG. 1B. As shown in FIG. 1E, the magnet 152 of the magnetic attachment system may define an exposed surface. The base 112 may define a recess dimensioned to fit the magnet 152 such that the exposed surface of the magnet is flush with an adjacent surface of the base 112. In some cases, the base 112 does not define a recess for the magnet 152, and the exposed surface of the magnet 152 is proud of the surface of the base 112. As depicted, the exposed magnet surface may contact the staple 106*a*. An advantage of this configuration may be a strong magnetic coupling of the staple 106*a* due at least in part to the exposed surface of the magnet allowing direct contact with the staple.

FIG. 1F illustrates another example configuration of a magnetic attachment system 122. In this example, the base 112 may define an interface surface 153 between the magnet 154 and the outside environment (e.g., where the staple 106*a* couples to the base 112). The interface surface 153 physically covers the magnet 154. This surface may be formed through injection molding. For example, the magnet 154 may be inserted into a mold and the body of the tool formed by introducing a polymer material into the mold to at least partially encapsulate the magnet 154 and form the interface surface 153. In other cases, the interface surface may be defined by a protective wrap, a cover coupled to the base 112, a plug inserted into a recess in which the magnet 154 is positioned, and so on. This embodiment may offer an aesthetically pleasing option and it may help to extend the life of the tool by protecting the magnet 154 from decoupling from the tool and by reducing the likelihood of damage to the magnet 154 due to impacts from the staple 106*a* and/or other objects.

FIG. 1G illustrates another example configuration of a magnetic attachment system 122. As depicted in FIG. 1G, the magnet 156 may be exposed but the base 112 may define a recess 157 that houses the magnet 156 in a recessed configuration. In this example, the magnet 156 and the staple 106*a* may have an air gap between them when the staple 106*a* is magnetically attached to the tool 100 via the magnet 156. While the staple 106*a* may not physically contact the magnet 156, the magnet 156 may still magnetically couple the staple to the base 112. In such embodiment, the tool may benefit from simple manufacturing and the magnets may be swapped as needed, and the magnet may also be protected from damage by preventing direct contact with the staples.

While FIGS. 1E-1G illustrate example arrangements for a single magnet, it will be understood that each magnet of the various magnetic attachment systems described herein may have the same or similar configurations. Moreover, any instance of a staple retention feature may also include magnetic attachment systems and thus may have magnets as described with respect to FIGS. 1E-1G.

Figure 1H:
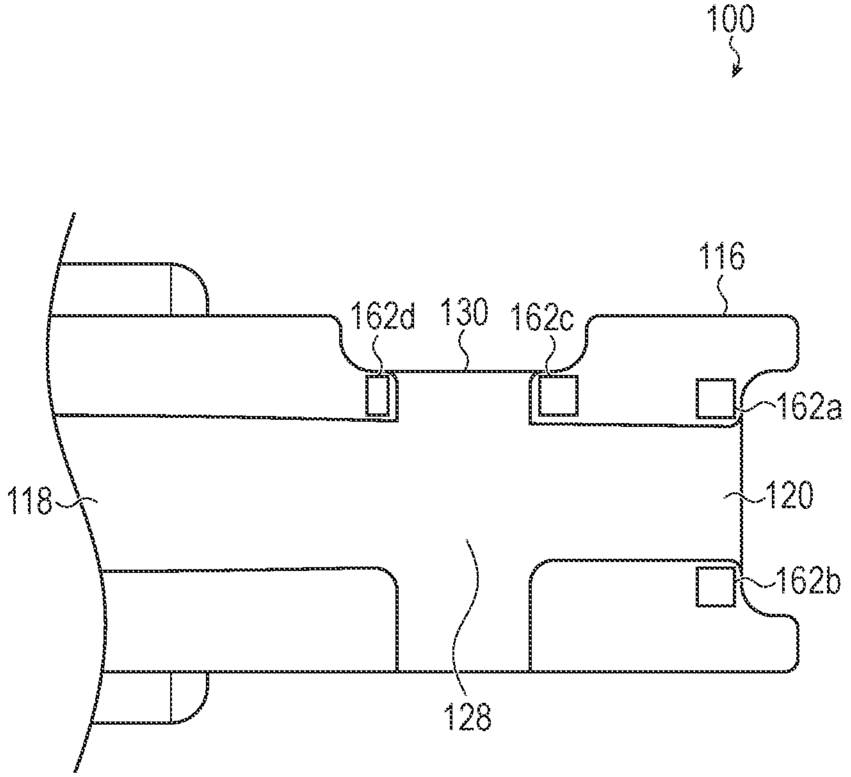

FIG. 1H illustrates an underside view of a portion of the base 112, illustrating an example configuration for coupling the magnets to the base 112. In the configuration in this example, holes 162*a*-162*d* may be defined along the bottom surface 116, though other examples may have the holes defined along a top surface or a peripheral surface of the base 112. The holes 162*a*-162*d* may be at a suitable location (e.g., at a suitable distance from a surface of a staple retention feature) such that magnets inserted into the holes 162*a*-162*d* can magnetically couple staples to the tool 100. The inserted magnets may be shielded from accidental impacts by a hammer, staple contact, and so on, as described with respect to FIG. 1F. The magnets may be oriented similar to the intended alignment of the legs of the staple, potentially facilitating staple alignment (e.g., such that a long axis of the magnet is parallel to a long axis of a staple leg). The inserted magnets may be glued into holes 162*a*-162*d*, capped within the holes, or coupled through any other suitable mechanism. As illustrated in FIG. 1H, the tool may define a first hole 162*a* and a second hole 162*b* that receives respective magnets. The holes 162*a*, 162*b* may be positioned along sides of the first alignment channel 118. Magnets positioned within holes 162*a*, 162*b* may magnetically couple a staple positioned at the first staple retention feature 120 to the tool 100. Similarly, the tool 100 may define holes 162*c*, 162*d* positioned along the second alignment channel 128. Magnets positioned within holes 162*c*. 162*d* may magnetically couple a staple positioned at the second staple retention feature 130 to the tool 100.

Figure 2A:
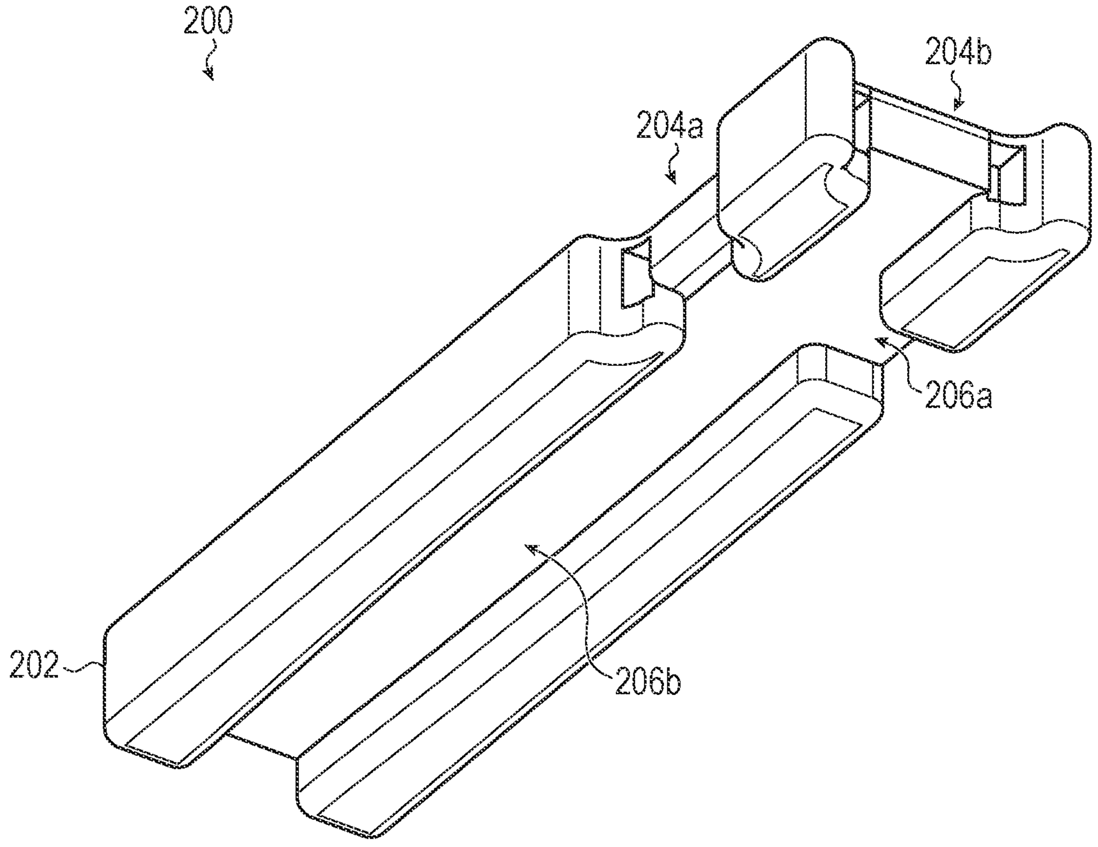
FIGS. 2A-2E depict another example tool for holding and setting staples with staples of multiple sizes coupled thereto.

FIG. 2A shows a perspective view of an embodiment of a tool 200. The tool 200 includes staple retention features as described with respect to FIGS. 1A-1H, but has a body structure with a different handle configuration (e.g., without a palm swell). As depicted, the tool 200 includes a body 202 that defines staple retention features 204*a*, 204*b* that are positioned along alignment channels 206*a*, 206*b* (e.g., at respective ends of the alignment channels). As described herein, the set tool 200 may be configured such that a surface (e.g., a bottom surface) of the set tool 200 may be positioned on a workpiece (e.g., a stud, fence post, or any other suitable object or surface) with a cable (or other object to be attached to the workpiece) received in one of the alignment channels 206*a*, 206*b*. In this position, a staple coupled to the body 202 (e.g., a staple positioned at the staple retention feature 204 and retained via a magnetic attachment system) is aligned with its legs or tines straddling the cable or other object, and can be set and/or driven into the workpiece.

As shown in FIG. 2A, the first alignment channel 206*a* may be perpendicular to the second alignment channel 206*b*. The first alignment channel 206*a* may be longer than the second alignment channel 206*b*. The provision of multiple alignment channels (e.g., 206*a*, 206*b*) aligned in a perpendicular arrangement, as shown in FIG. 2A, may allow the user to choose the most-comfortable and/or effective orientation of the tool at each installation location. Further, the different lengths of the alignment channels 206*a*, 206*b* allow the user to select the tool orientation that is most suitable for the intended location of the staple.

Figure 2B:
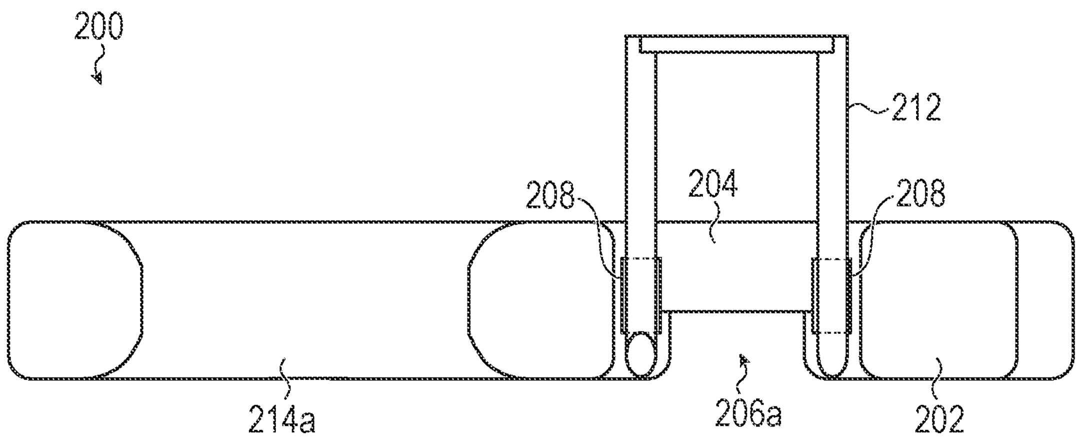

FIG. 2B is a side view of the tool 200 with a staple 212 attached to magnets 208 (e.g., magnets of a magnetic attachment system) and aligned with the alignment channel 206*a*. The staple 212 may be a 9/16 inch staple, such as may be recommended for a certain category of wiring (e.g., 14/3, 12/2 Romex wiring), or a staple of any other suitable size and/or shape. The magnets 208 may be positioned such that they are aligned with the staple's legs or tines when the staple is coupled to the tool 200. In this alignment, the staple straddles the alignment channel 206*a*. The distance between the legs of the staple may be wider than the alignment channel 206*a*, such that the staple will not intrude into the channel 206*a* and such that piercing or damage to the cable may be prevented or inhibited when the staple 212 is struck. As an example, the width of the alignment channels 206, in conjunction with the positioning and size of the retention magnets 208, ensures that both ½ inch and 9/16 inch (or other sized) staples can be successfully aligned relative to and safely driven around the wiring, e.g., without piercing the sheathing and possibly compromising the installation. The staple retention feature 204 may be defined by curved walls which may guide the staple as it is struck, and may help to maintain staple alignment and prevent or inhibit contact with or damage to the cable or other object being fastened.

FIG. 2A illustrates an example where a handle portion of the body 202 (e.g., along alignment channel 206*b*) defines straight sides. This configuration may facilitate simple manufacturing and may add additional stiffness to the tool for striking. FIGS. 2B-2E illustrate an example in which the handle portion of the body of the tool 200 defines holding grooves 214*a*, 214*b* (described with respect to FIG. 2D), to facilitate a user grasping the tool 200.

Figure 2C:
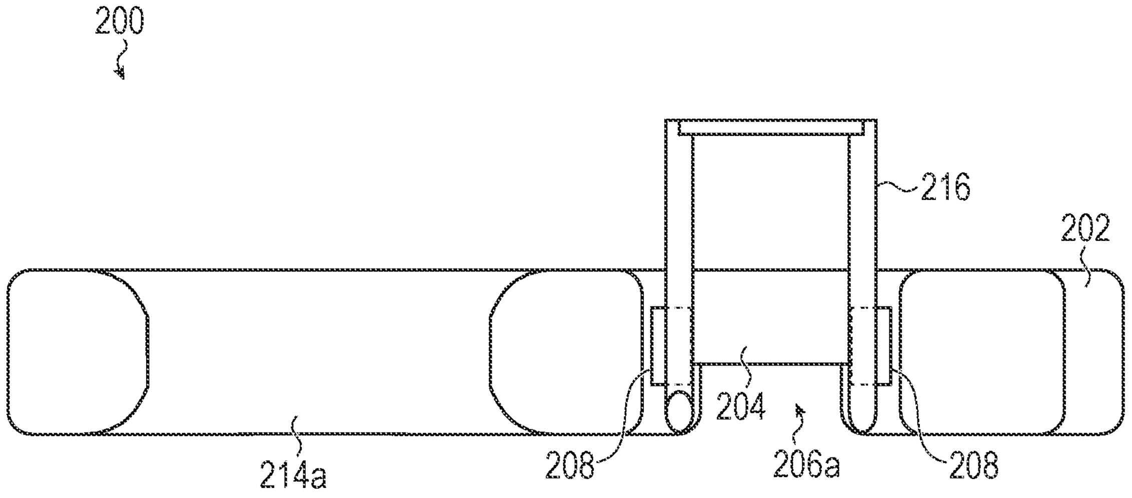

FIG. 2C is another side view of the tool 200 with a staple 216 attached to the magnets 208 and aligned with the alignment channel 206*a*. The staple 216 may be a different size than the staple 212 in FIG. 2B, but the tool 200 may still accommodate the staple for alignment and setting operations. The staple 216 may be a ½ inch staple, such as used for a certain category of wiring (e.g., 14/2 Romex wiring). When coupled to the tool 200, the staple 216 (which is smaller than the staple 212) may self-center between the equally-powered magnets 208. The size of the channel and the self-centering function of the magnets may help keep the legs of the smaller staple 216 outside the alignment channel 206*a* and help prevent piercing or otherwise damaging the cable when the staple is struck. Further, the curved walls that define the staple retention feature 204 may guide the staple when being attached to the tool 200 and when being struck, and therefore may help maintain staple alignment during fastening to prevent or inhibit contact with or damage to the cable or other object being fastened. The curve of the walls may contact and guide staples of multiple widths, and the magnetic attachment features may magnetically attach staples of different widths.

Figure 2D:
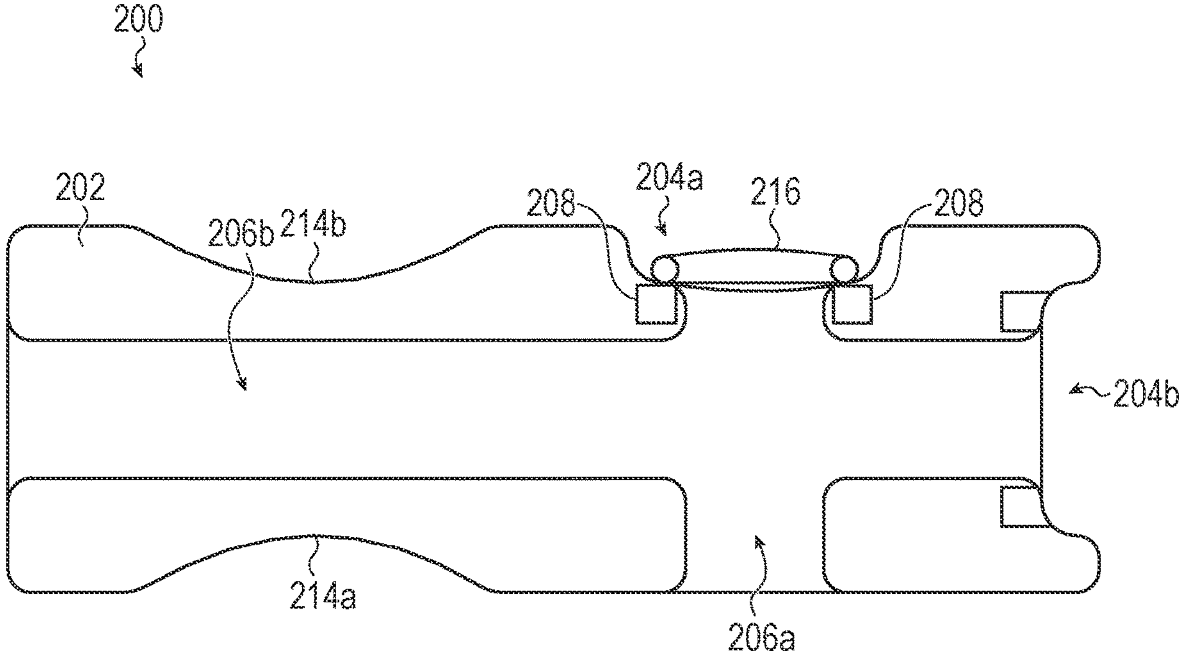

FIG. 2D is a bottom view of the tool 200 with the staple 216 magnetically retained in the staple retention feature 204*a*. As depicted, the holding grooves 214*a*. 214*b* may be positioned on opposite sides of the tool 200 and may be configured such that a user may hold the tool 200 by pressing at least one finger on each groove. The holding groove 214*a* may be dimensioned to accommodate the index and the middle finger, and the holding groove 214*b* may accommodate the thumb of the user on the opposing side. The holding grooves 214*a*. 214*b* may be positioned at a suitable distance away from the staple retention feature 204 to avoid possible injury to the user when a hammer strikes the staple. For example, the holding grooves 214*a*, 214*b* may be greater than about 0.5 inches, greater than about 1.0 inch, or greater than about 2.0 inches from the nearest staple retention feature (e.g., 204*a*).

The positions of the staple retention features 204*a*, 204*b* are sufficiently spaced apart from one another so that two staples may be loaded at once for more efficiency, and to minimize the likelihood that a hammer strike hits the wrong staple. In some cases, the distance from the center of the crown of a staple coupled to the staple retention feature 204*a* to the center of the crown of a staple coupled to the staple retention feature 204*b* may be about 0.5 inches, about 0.75 inches, about 1.0 inch, about 2.0 inches, or another suitable distance.

Figure 2E:
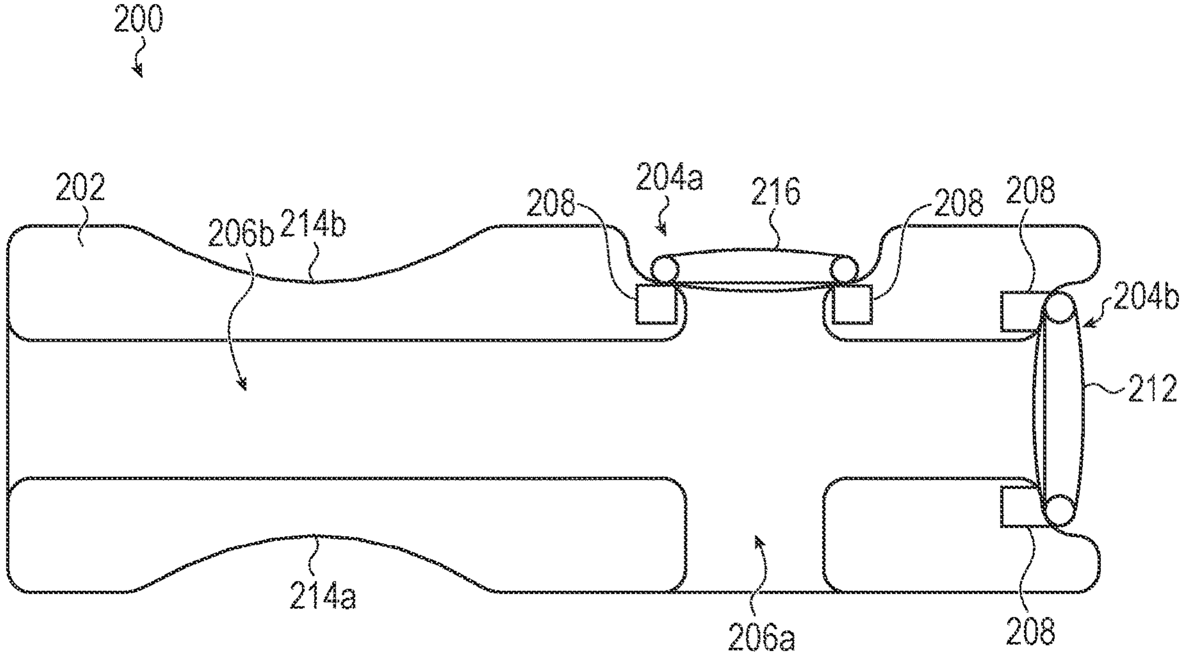

FIG. 2E depicts a bottom view of the tool 200, with staples of two different sizes in the staple retention features 204*a*, 204*b*. As shown in FIG. 2E, the magnets 208 keep the legs of the first staple 216 aligned with the underlying channel 206*a* (e.g., the first alignment channel 206*a*). The magnets 208 may also keep the legs of the second staple 212 aligned with the underlying channel 206*b* (e.g., the second alignment channel), despite the different staple sizes (e.g., staple widths). The alignment of the staples 212, 216 may ensure that such staples are driven safely and efficiently around the cable when the tool 200 is positioned against a workpiece. The first alignment channel 206*a* may have a different width from the second alignment channel 206*b* to accommodate different sized staples and/or different sized cables (or other objects to be fastened).

Figure 3A:
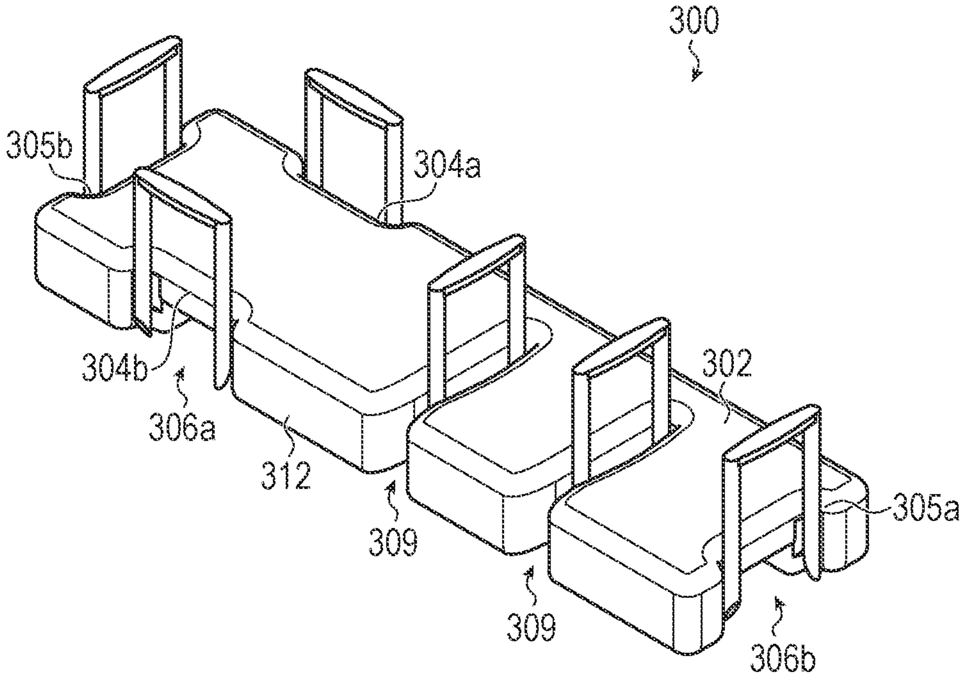
FIGS. 3A-3B depict an example tool for holding and setting multiple staples.
Figure 3B:
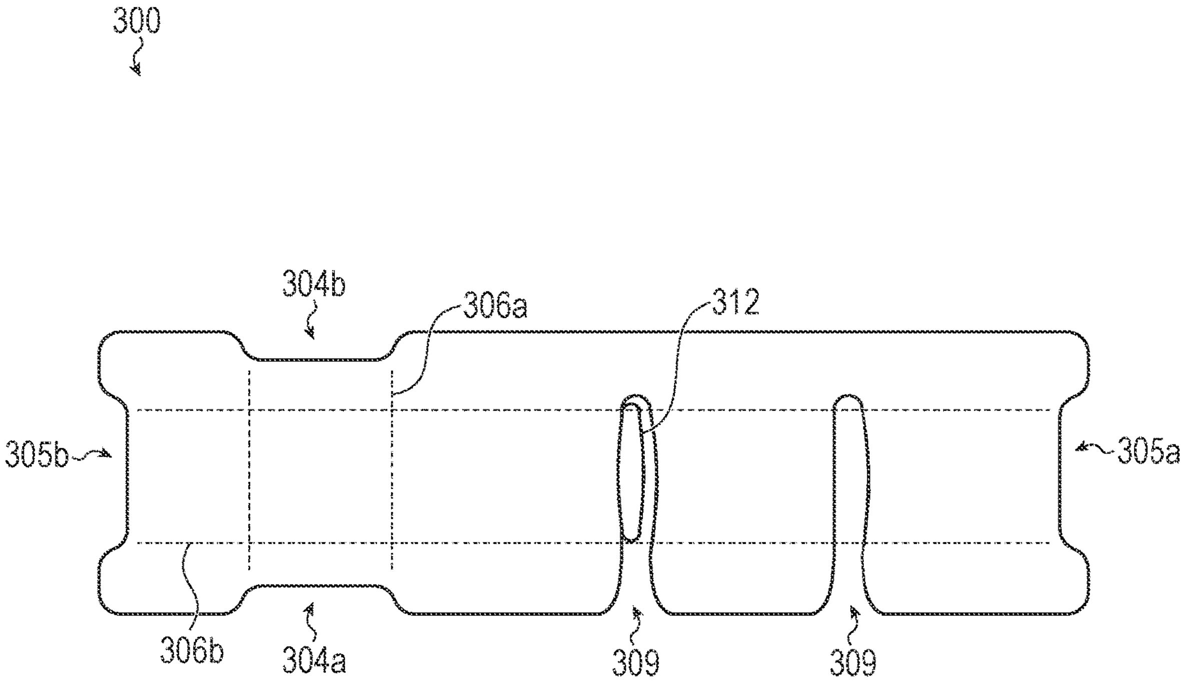

FIGS. 3A-3B illustrate a tool 300 that is configured to hold up to six staples. The tool 300 may include a first alignment channel 306*a* and a second alignment channel 306*b*, as shown in FIG. 3B. The alignment channels 306 may generally correspond to the alignment channels shown and described with respect to FIG. 1A-2E. The tool 300 may define a first staple retention feature 304*a* and a second staple retention feature 304*b*, each staple retention feature 304*a*, 304*b* positioned along the first alignment channel 306*a*. The first staple retention feature 304*a* may be positioned at a first end of the first alignment channel 306*a* and the second staple retention feature 304*b* may be positioned at a second end of the first alignment channel 306*a*. The tool 300 may also define a third staple retention feature 305*a* and a fourth staple retention feature 305*b* positioned along the second alignment channel 306*b*. In some examples, the third staple retention feature 305*a* may be positioned at a first end of the second alignment channel 306*b* and the fourth staple retention feature 305*b* may be positioned at a second end of the second alignment channel 306*b*.

The tool body 302 also defines staple retention slots 309 (which are examples of staple retention features) positioned along the second alignment channel 306*b*. Each of the staple retention slots 309, along with an associated magnetic retention system, may releasably couple a staple to the tool body 302. The staple retention slots extend from a peripheral side 312 of the tool body 302 up to a portion of the tool body 302. To insert a staple, a user may slide a staple into a retention slot 309 from the opening along the peripheral side 312. The shape of the staple retention slot may help align the staple along the second alignment channel 306*b*, and the magnetic retention feature may retain the staple in position in the retention slot 309 in preparation for attachment to a workpiece.

Each staple retention slot may include a magnetic attachment system (e.g., permanent magnets coupled to the tool body 302) that detachably couples the staples to the tool body 302. The configuration of such magnetic attachment systems may be the same as or similar to those shown and described with respect to the tools 100 and 200.

Each staple retention slot 309 may be positioned a certain minimum distance from any other staple retention feature 304*a*, 304*b*, 305*a*, 305*b* or from any other staple retention slot 309 (e.g., about 0.5 inches, about 0.75 inches, about 1.0 inch, about 2.0 inches, or another suitable dimension), to help ensure that each staple can be struck individually and without contacting an adjacent or nearby staple. The staple retention slots 309 may detachably couple a staple without magnets. For example, the staple retention slots 309 may retain staples using frictional forces. In such cases, the tool 300 may include compliant materials or structures in the retention slots 309, such as rubber or foam structures, that are deflected by the staples to provide an interference fit that retains the staples in place during alignment of the tool relative to a workpiece, but that allows the staples to move when driven into a workpiece during a setting operation. As shown in FIG. 3B, the edges of the staple retention slots 309 may be a rounded edge or a fillet edge. This configuration may allow for easier setting of the staple while coupled to the tool (e.g., the rounded edge may help drive the staple further into the workpiece), and may allow for easier disengagement of the staple and tool body after the staple has been driven at least partially into the work surface.

The staple retention slots 309 may be staple retention pockets, where the slots are not open along the peripheral side 312 of the body. In such configuration, the user may insert a staple through the top portion of the body.

Figure 4:
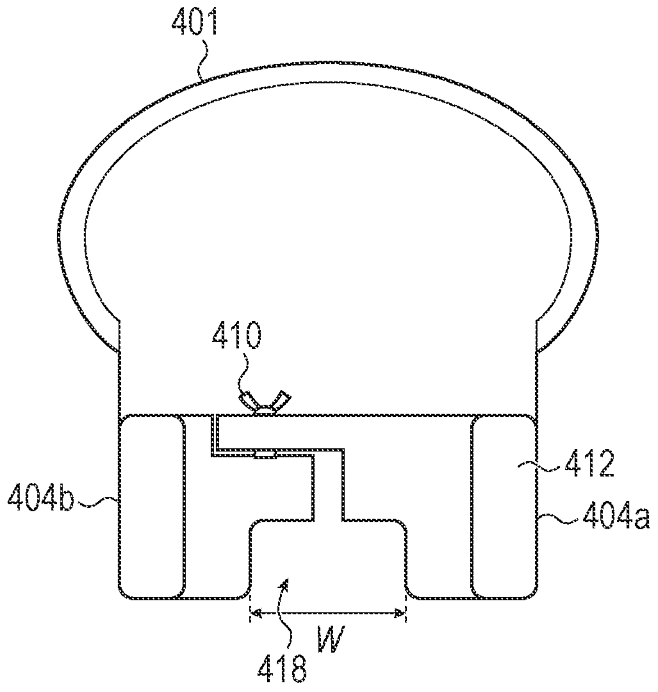
FIG. 4 depicts an example of the magnetic attachment of a tool for holding and setting staples having an adjustable alignment channel.

FIG. 4 illustrates an end view of an embodiment of a set tool 401. In this example, the base 412 of the set tool 401 (which may be an embodiment of or otherwise similar to the base 112 of the set tool 100) includes a fixed side 404*a* and a movable side 404*b*. An adjustable alignment channel 418 having a width W is defined between the fixed side 404*a* and the movable side 404*b*. The adjustable alignment channel allows the set tool 401 to accommodate a wide range of cable sizes and staples. To adjust, a user may loosen a fastening mechanism 410 and slide the movable side 404*b* towards or away from the fixed side 404*a* to the desired width W to accommodate a staple and/or object size. The user may then tighten the fastening mechanism 410 to prevent further movement of the adjustable alignment channel. As described above, the set tool 401 may include a magnetic attachment system (disposed in sides 404*a* and/or 404*b*), which may detachably couple the staple to the set tool 401. The adjustment channel may lock or unlock without the need for a user to tighten a mechanism (e.g., ratchet mechanism).

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the some embodiments of the disclosure, whether or not such embodiments are described and whether or not such features are presented as being a part of a described embodiment. For example, properties and/or functions of the magnetic attachment systems shown and/or described with respect to one figure or one example tool may be equally applicable to other figures or example tools. As other non-exhaustive examples, properties and/or functions of the staple retention features, alignment channels, tool construction, tool materials, the manner in which magnets are coupled to a tool body, or the like, described with respect to one figure or one example tool may be equally applicable to other figures or example tools Thus, the breadth and scope of the described disclosure should not be limited by any of the above-described exemplary embodiments but are instead defined by the claims herein presented.

What is claimed is:

1. A tool for holding a fastener during an alignment and setting operation, comprising:
- a body structure configured to be positioned on a workpiece and defining:
  - a first support column and a second support column, the first support column defining a first end surface and the second support column defining a second end surface;
  - a first alignment channel configured to receive therein an object to be fastened to the workpiece, the first alignment channel defined between the first support column and the second support column;
  - a first recess at an end of the first alignment channel and configured to align a first staple relative to the first alignment channel such that opposite legs of the first staple are on opposite sides of the first alignment channel;
  - a second alignment channel configured to receive therein the object to be fastened to the workpiece; and
  - a second recess at an end of the second alignment channel and configured to align a second staple relative to the second alignment channel such that opposite legs of the second staple are on opposite sides of the second alignment channel;
- a first magnetic attachment system configured to releasably retain the first staple to the body structure; and
- a second magnetic attachment system configured to releasably retain the second staple to the body structure, wherein
- the body structure is configured such that a crown of the first staple is exposed to receive a striking force thereon when the first staple is positioned in the first recess and the body structure is positioned on the workpiece; and
- the first end surface of the first support column and the second end surface of the second support column are configured to contact the workpiece when the object is positioned within the first alignment channel, prior to the first staple being driven into the workpiece.

2. The tool of claim 1, wherein the first and second alignment channels are perpendicular to one another.

3. The tool of claim 1, wherein the first recess is formed along a peripheral side of the body structure.

4. The tool of claim 1, wherein the end of the second alignment channel is a first end of the second alignment channel, the tool further comprising:
- a third recess at a second end of the second alignment channel and configured to receive a third staple therein; and
- a third magnetic attachment system configured to releasably retain the third staple in the second alignment channel and in a position such that opposite legs of the third staple are on opposite sides of the second alignment channel.

5. The tool of claim 1, wherein:

the body structure further defines a third support column and a fourth support column, the third support column defining a third end surface and the fourth support column defining a fourth end surface;

the first alignment channel is further defined between the third support column and the fourth support column; and the third end surface of the third support column and the fourth end surface of the fourth support column are configured to contact the workpiece when the object is positioned within the first alignment channel, prior to the first staple being driven into the workpiece.

6. A handheld tool for holding and aligning a staple, comprising:

a base defining:

a bottom side defining;

a first support column and a second support column, the first support column defining a first end surface and the second support column defining a second end surface;

a first alignment channel configured to at least partially receive a first cable therein, the first alignment channel defined between the first support column and the second support column; and a second alignment channel configured to at least partially receive a second cable therein;

a first recess positioned along the first alignment channel, the first recess configured to detachably hold a first staple such that legs of the first staple straddle the first cable when the first cable is at least partially received in the first alignment channel; and a second recess positioned along the second alignment channel, the second recess configured to detachably hold a second staple such that legs of the second staple straddle the second cable when the second cable is at least partially received in the second alignment channel; and a handle coupled to the base and positioned opposite the bottom side, wherein the base is configured such that a crown of the first staple is exposed to receive a striking force thereon when the first staple is positioned in the first recess and the base is positioned on a workpiece with the first cable at least partially received in the first alignment channel; and the first end surface of the first support column and the second end surface of the second support column are configured to contact the workpiece when the first cable is positioned within the first alignment channel, prior to the first staple being driven into the workpiece.

7. The handheld tool of claim 6, wherein:

the handheld tool comprises a first magnet proximate the first recess and configured to magnetically retain the first staple to the base; and the handheld tool comprises a second magnet proximate the second recess and configured to magnetically retain the second staple to the base.

8. The handheld tool of claim 7, wherein:

the first magnet defines a first exposed magnet surface;

the first magnet is configured to contact at least part of the first staple when the first staple is held to the base by the first magnet;

the second magnet defines a second exposed magnet surface; and the second magnet is configured to contact at least part of the second staple when the second staple is held to the base by the second magnet.

9. The handheld tool of claim 6, wherein:

the base further comprises a first magnet coupled to the base proximate the first recess, the first magnet configured to attract at least a portion of the first staple.

10. The handheld tool of claim 6, further comprising a carrying tab extending from the base.

11. The handheld tool of claim 6, wherein the base and the handle are a monolithic piece.

12. The handheld tool of claim 6, wherein:

the first recess is positioned at an end of the first alignment channel; and the second recess is positioned at an end of the second alignment channel.

13. The handheld tool of claim 6, wherein the base is formed from a visually transparent material.

14. The handheld tool of claim 6, wherein:

the base defines a staple retention slot extending from an opening along a peripheral side of the base; and the staple retention slot is configured to detachably hold a third staple such that legs of the third staple straddle the first cable when the first cable is at least partially received in the first alignment channel.

15. The handheld tool of claim 6, wherein a width of the first alignment channel is adjustable.

16. A tool for setting staples against a workpiece, the tool comprising:

a base defining:

a top surface;

a first support column defining;

a first end surface; and a first side of an alignment channel, the alignment channel configured to receive therein at least a portion of an object to be attached to the workpiece;

a second support column defining:

a second end surface; and a second side of the alignment channel; and a recess at an end of the alignment channel and configured to receive at least a portion of a staple therein; and at least one magnet coupled to the base and configured to detachably secure the staple at least partially in the recess and position the staple such that:

a crown of the staple protrudes above the top surface of the base and is exposed to receive a striking force thereon; and opposing legs of the staple straddle the alignment channel, wherein the first end surface of the first support column and the second end surface of the second support column are configured to contact the workpiece when the object is positioned within the alignment channel, prior to the staple being driven into the workpiece.

17. The tool of claim 16, wherein the at least one magnet is configured to detachably secure legs of the staple to the base.

18. The tool of claim 16, wherein:

the alignment channel is a first alignment channel;

the staple is a first staple;

the recess is a first recess;

the striking force is a first striking force;

the at least one magnet is at least one first magnet; and the base further defines:

a third support column configured to contact the workpiece and defining a first side of a second alignment channel, the second alignment channel configured to receive therein the at least a portion of the object to be attached to the workpiece;

a fourth support column configured to contact the workpiece and defining a second side of the second alignment channel; and a second recess configured to receive at least a portion of a second staple therein; and at least one second magnet coupled to the base and configured to detachably secure the second staple at least partially in the recess and position the staple such that:

the crown of the second staple protrudes above the top surface of the base and is exposed to receive a second striking force thereon; and opposing legs of the second staple straddle the second alignment channel.

19. The tool of claim 18, wherein the at least one second magnet is configured to detachably couple legs of the staple to the base.

20. The tool of claim 16, further comprising a handle positioned over the top surface of the base.

* * * * *